UNITED STATES PATENT OFFICE.

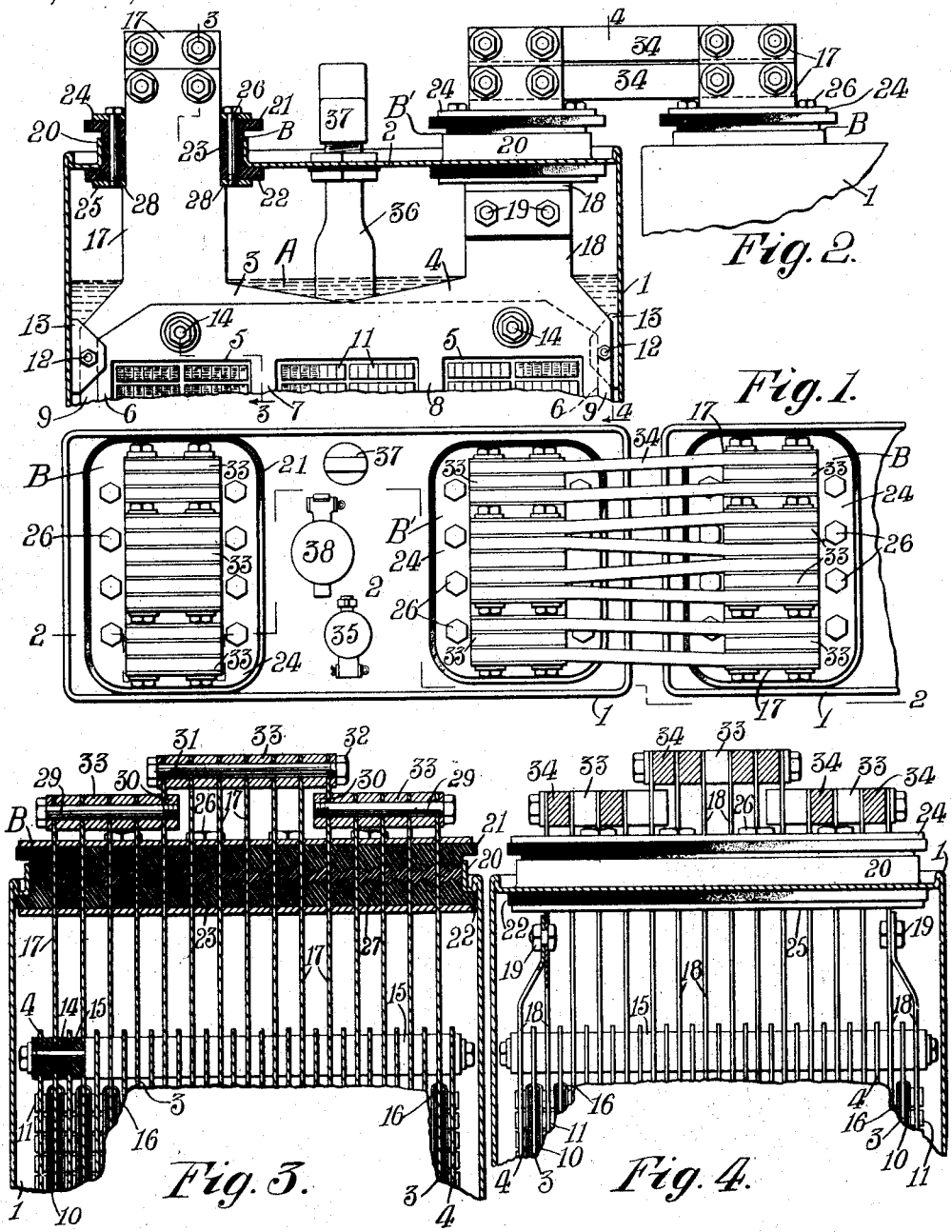

CHARLES W. NORTON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

SECONDARY OR STORAGE BATTERY.

1,204,481.     Specification of Letters Patent.     Patented Nov. 14, 1916.

Application filed August 13, 1914. Serial No. 856,527.

*To all whom it may concern:*

Be it known that I, CHARLES W. NORTON, a citizen of the United States, and a resident of West Orange, in the county of Essex and State of New Jersey, have invented certain new and useful Improvements in Secondary or Storage Batteries, of which the following is a description.

My invention relates to improvements in secondary or storage batteries, and more particularly to the mechanical details of construction thereof; and while the present improvements have been designed especially for use in connection with storage batteries of the Edison type wherein insoluble active materials are employed in an alkaline electrolyte, it is to be understood that the invention is also applicable for use in storage batteries of other types.

The principal object of my invention is to provide an improved construction for storage battery cells, adapted especially for cells having a high capacity and discharge rate such as those used in installations on submarine vessels, which may be easily and quickly assembled and whereby such cells will be rendered lighter and cheaper to manufacture and the operation thereof will be improved and their efficiency increased.

My invention also contemplates the provision of improved means for connecting adjacent cells of this type whereby there will be a more uniform distribution of the current among the plates of each cell than is obtained by the usual construction, and whereby such cells will be maintained in proper spaced relation and be mutually braced.

Other features of my invention reside in the details of construction and combinations of elements hereinafter more fully described and claimed.

In order that my invention may be more clearly understood, attention is directed to the accompanying drawing forming a part of this specification and in which:

Figure 1 is a plan view, partly broken away, of a pair of cells equipped with my invention; Fig. 2 is a sectional view, partly in elevation and partly broken away, taken approximately on the broken line 2—2 of Fig. 1; Fig. 3 is a sectional view, partly broken away, taken approximately on line 3—3 of Fig. 2; and Fig. 4 is a sectional view, partly broken away, taken approximately on line 4—4 of Fig. 2.

In all the views of the drawing, corresponding parts are designated by the same reference characters.

Referring to the drawing, reference character 1 represents the cans or containers of two secondary cells or batteries, which containers are substantially rectangular in form and preferably have the tops 2 welded to the side walls, as is usual in storage batteries of the Edison type.

Within the container of each cell is disposed a bank or group of positive and negative plates or elements 3 and 4. These positive and negative plates are preferably alternately arranged side by side and extend transversely of the container, and the number of negative plates preferably exceeds the number of positive plates by one, whereby both outside plates adjacent the front and rear walls of the container will be of negative polarity. Each plate preferably comprises a substantially rectangular grid provided with a plurality of vertical rows of equal sized openings 5, whereby the grid is formed with the vertical strips or "risers" 6, 7, 8 and 9 adjacent the openings. In the openings 5 of each grid are suitably secured the positive or negative tubes or pockets, the positive tubes 10 preferably being vertically disposed and the negative pockets 11 preferably being horizontally disposed.

In order to increase the conductivity or current carrying capacity of each grid toward the pole side thereof, the strips 7 and 8 are wider than strip 6 and strip 9 is wider than strips 7 and 8. The "risers" 7 and 8 are preferably of equal width whereby the vertical rows of openings in any grid may be and are respectively registered with the vertical rows of openings in the adjacent grids to obtain the most effective relative positioning of the positive and negative tubes or pockets carried thereby. Owing to the difference in width of "risers" 6 and 9, the positive plates will project beyond the negative plates at one side of the cell and the negative plates will project beyond the positive plates at the other side of the cell, as clearly shown in Fig. 2. The projecting portions of the positive and negative plates at the opposite sides of the cell are respectively rigidly secured together and the plates are spaced and insulated from each other and from the adjacent side walls of container 1, preferably by means of bolts 12 and insulating blocks 13 of hard rubber mounted on the bolts. All the plates are rigidly secured together and spaced and insulated from each other at their upper portions preferably by means of bolts 14 and hard rubber washers or sleeves 15 mounted on these bolts. The plates are supported at their lower edges and insulated from the bottom of the can or container 1 and insulated and spaced from the front and rear walls of the container by any suitable means (not shown). The positive tubes 10 and negative pockets 11 of adjacent plates 3 and 4 are suitably insulated and separated from each other, preferably by means of inverted U-shaped hard rubber strips 16 which pass through and are supported by the plates 3 at the upper portions of the latter above tubes 10. The construction above described is similar to that disclosed and claimed in an application of Miller Reese Hutchison and Charles W. Norton, Serial No. 856,516, filed August 13, 1914, and entitled Storage batteries, to which application reference is hereby made for a more detailed description.

In storage batteries of the Edison type as usually constructed, the positive and negative plates are respectively mounted on and secured together by a pair of metallic rods or bolts, being spaced from each other by metallic washers on these rods or bolts. Each of the rods or bolts passes through the lower end portion of a vertical rod which is disposed between two adjacent plates, and this rod extends above the container through the top thereof and serves as one of the poles or terminals of the cell to the outer end portion of which connection is made to convey current to or from the cell or to connect the cell with an adjacent cell. In such a construction there is considerable loss of energy when the cell is charged and discharged, on account of the resistance in the numerous joints in the paths of the current to or from each of the pole connections. By the construction which will now be described, these losses are largely eliminated and a considerable saving of weight in the cell is effected. In each cell the positive plates 3 are each provided adjacent one side with an integral vertical projection or portion 17 and the negative plates 4 are each provided adjacent the opposite side with an integral vertical projection or portion 18. The projections 17 are each in the same plane as the respective positive plate 3 of which it is a part and all these projections extend through a stuffing box B secured in the top 2 of the container. All the projections 18, except those of the two outside negative plates 4, are each in the same plane as the respective plate 4 of which it forms a part, and extend through a stuffing box B' secured in the top 2 of the container.

The projections 17 and 18 which extend through the stuffing boxes B and B' form the poles or terminals of the cell and the outer end portions thereof serve as convenient means for making electrical connection with the cell, as will be hereinafter described. It will be obvious that in this construction no losses such as above described can occur, as the plates and poles are integrally formed. Each projection 17 or 18 is made of sufficient size to readily carry a current considerably greater than that for which its respective plate is designed and consequently the internal resistance of the cell is small.

The length of the cell depends on the number of plates therein and the length of the stuffing boxes B and B' required for the respective series of projections 17 and 18. If all the projections 18 of the negative plates were extended through the stuffing box B', the latter would have to be somewhat longer than stuffing box B as the number of negative plates is greater by one than the number of positive plates. Accordingly, the projections 18 of the two outside negative plates are each terminated inside the container 1 and electrically connected above the level of the electrolyte A to the adjacent negative plate and only the projections of the remainder of the negative plates are extended through the stuffing box B'. Therefore, the latter may be made slightly shorter than stuffing box B, as shown in Figs. 1, 3 and 4, whereby considerable reduction in the length of container 1 and in consequence a saving in the amount of electrolyte and weight of the cell may be effected. The electrical connection of each outside plate 4 with the adjacent negative plate is preferably effected by deflecting inwardly the upper end portion of the projection 18 of the outside plate and connecting the same directly to the adjacent projection 18 as by means of bolts 19, as shown in Figs. 1 and 4. As there is but a single positive plate 3 adjacent each outside negative plate 4, theoretically there will be only one-half the current generated in such negative plate as in the adjacent negative plate, and consequently, the current carrying capacity of the projection 18 of the latter will not be overtaxed by the additional current from the negative plate electrically connected therewith.

Each of the stuffing boxes B and B' is secured to the container top 2 in a substantially rectangular opening extending lengthwise of the container, the material of the top at the edge of the opening being formed into an upstanding flange 20. Each of the stuffing boxes preferably comprises a pair of flanged hard rubber members or bushings 21 and 22 and a suitable resilient packing member 23, preferably of soft rubber, interposed between members 21 and 22. A pair of metallic plates 24 and 25 are respectively disposed above the upper member or bushing 21 and beneath the lower member 22 of each stuffing box, and bolts 26 are passed through members 21, 22, 23, 24 and 25, the heads of the bolts bearing on the upper plate 24 and the lower ends thereof being threaded into the lower plate 25. Parts 21, 22, 23, 24 and 25 are provided with registering openings or slots through which the projections 17 or 18 extend. The surfaces of members 21 and 22 which engage the packing member 23 are provided with ridged portions 27 parallel to and adjacent the openings therein. It will be obvious that on tightening bolts 26, members 21 and 22 will be forced toward each other and the soft rubber members 23 will thereby be compressed and expanded laterally to form fluid tight joints with the projections 17 and 18. By reason of the raised or ridged portions 27 but a comparatively slight movement of members 21 and 22 toward each other is necessary in order to expand member 23 laterally sufficiently to render the joints fluid tight.

The projections 17 and 18 which extend through the stuffing boxes are each provided with shoulders 28 which engage the plates 25 and serve to prevent outward movement of the battery elements or plates with respect to the container when the cell is lifted by its terminals.

The projections 17 and 18 of each cell are preferably respectively rigidly connected together in spaced relation at their outer ends above the stuffing boxes B and B' in a plurality of groups, each of which groups comprises a plurality of adjacent projections. There are preferably a set of three such groups of projections 17 and 18 respectively and the projections of the central group of each set preferably extend a slight distance above the projections of the adjacent groups. The projections of the two outer groups of each set are rigidly connected together by horizontal bolts 29 and nuts 30, while the projections of the central group are connected together above the other groups by horizontal bolts 31 and nuts 32. The projections of each group are properly spaced by members or blocks 33 preferably of copper through which the bolts 29 and 31 extend. The bolts 29 which connect the projections of the outer groups of each set also respectively extend through the outside projections of the central group whereby all the projections 17 and 18 respectively are rigidly connected. By this construction, the removal or insertion of the bolts 29 and 31 of any cell of a battery of cells arranged side by side is not interfered with by an adjacent cell.

A plurality of heavy bars 34, preferably of copper, are employed for connecting the positive terminals or projections 17 of one cell with the negative terminals or projections 18 of an adjacent cell of a battery, the ends of each of these bars being respectively disposed between two of the adjacent projections 17 and 18 in place of blocks 33 and secured in place by the bolts 29 or 31 which are passed therethrough. The arrangement of bars 34 is preferably such that each of the projections 17 of one cell and each of the projections 18 of the other cell which extend above the container contact directly with one of the bars, whereby the current will be uniformly and evenly distributed among the plates of each cell. The bars 34 are preferably symmetrically disposed on each side of a vertical plane passing transversely and centrally through each of the cells connected thereby and serve to maintain these cells properly spaced and to brace the same from each other. Each cell is preferably provided with the usual filling opening in the top 2 thereof which is normally maintained closed by a cap or cover 35.

Reference character 38 indicates generally a safety device secured in the top 2 of the container for controlling the escape of gases from and the admission of air to the interior of the cell, and is preferably similar to the construction disclosed and claimed in an application of Miller Reese Hutchison, Serial No. 827,784, filed March 28, 1914, and entitled Safety devices.

Preferably, each cell is also provided with a tubular member or drain tube 36 extending through and secured to the container top 2 and having its upper end normally closed by a cap 37 and its lower end terminating adjacent the bottom of the container. On removing cap 37 the electrolyte of the cell may be readily removed, without tipping or inverting the cell, either by applying pressure to the surface of the electrolyte through the safety device 38 or suction to the upper end of the tubular member. This device for removing the electrolyte is similar to that disclosed and claimed in an application of Miller Reese Hutchison, Serial No. 834,293 filed April 25, 1914 and entitled Storage batteries.

It is to be understood that many changes in the shape, size and arrangement of parts of the construction shown and described herein may be made without any departure from the spirit of my invention, and the scope of the appended claims.

Having now described by invention, what I claim as new and desire to protect by U. S. Letters Patent is as follows:—

1. In a storage battery cell, the combination of a container, and a plurality of plates therein, one of said plates being electrically connected within the container and above the surface of the electrolyte to another plate of like polarity, and others of said plates having projections extending through the top of the container, substantially as described.

2. In a storage battery cell, the combination of a container, and a group of positive and negative plates therein, the two outside plates of the group each being connected at its upper end portion with the next adjacent plate of like polarity, all the remaining plates having extensions projecting through the top of the container, substantially as described.

3. In a storage battery cell, the combination of a container, and a plurality of substantially parallel plates or elements therein, the two outside plates each being electrically connected within the container and above the surface of the electrolyte to the next adjacent plate of like polarity, all the remaining plates having extensions projecting through the top of the container and constituting the poles or terminals of the cell, substantially as described.

4. In a storage battery cell, the combination of a container, and a plurality of substantially parallel plates therein, the upper end portion of each outside plate being deflected inwardly and directly connected within the container and above the surface of the electrolyte to the next adjacent plate of like polarity, all the remaining plates having extensions projecting through the top of the container and constituting the poles or terminals of the cell, substantially as described.

5. In a storage battery cell, the combination of a container, a group of alternately arranged positive and negative plates therein, and a pair of stuffing boxes secured to the top of the container, all the plates except the two outside plates of the group having projections extending through said stuffing boxes, the projections of the positive plates extending through one of said stuffing boxes and the projections of the negative plates extending through the other of said stuffing boxes, the two outside plates being each electrically connected at its upper end portion with the next adjacent plate of like polarity, substantially as described.

6. In a storage battery cell, the combination of a container, a plurality of substantially parallel plates therein, each having a portion extending through the top of the container, and a stuffing box secured in the top of said container and provided with substantially parallel openings through which said portions respectively pass, said stuffing box comprising a resilient packing and a relatively movable member provided with means whereby a slight relative movement of said member and packing toward each other will effect a comparatively great lateral expansion of the packing to form fluid-tight joints between said container top and said plates, substantially as described.

7. In a storage battery cell, the combination of a container, a plurality of substantially parallel plates therein each having a portion extending through the top of the container, and a stuffing box secured in the top of the container and provided with a plurality of substantially parallel openings through which said portions respectively pass, said stuffing box comprising a resilient packing member, a rigid member engaging the same and means for forcing said members together to compress the packing member and expanding it laterally to form fluid-tight joints between said container top and the plates, the surface of said rigid member engaging the resilient packing member having raised portions or ridges whereby but a slight movement of said members toward each other is necessary in order to expand the packing member laterally to form said fluid-tight joints, substantially as described.

8. A stuffing box for storage battery cells comprising a rigid member, a resilient member, means for forcing said members together to compress said resilient member and expand the same laterally, said members each being provided with a series of substantially parallel openings or slots, the openings of the two series respectively registering, and means whereby a slight relative movement of the rigid member and resilient member toward each other will effect a comparatively great lateral expansion of the resilient member, substantially as described.

9. A stuffing box for storage battery cells comprising a rigid member having a series of substantially parallel slots therethrough, a resilient member engaging the rigid member and having a series of substantially parallel slots therethrough respectively registering with the slots of the rigid member, and means for forcing said members together to compress the resilient member and expand the same laterally, the surface of said rigid member engaging the resilient member being provided between the slots therein with ridged portions substantially parallel to the slots, substantially as described.

10. In a storage battery cell, the combination of a container, and a plurality of plates therein, said plates having projections extending through the top of the container, said projections being secured together at different levels exteriorly of the container in a plurality of groups, each such group comprising a plurality of adjacent projections, substantially as described.

11. In a storage battery cell, the combination of a container, a plurality of plates therein, said plates having parallel projections arranged adjacent each other in a row, said projections extending through the top of the container, a plurality of groups of said projections, each group comprising a plurality of adjacent projections extending to different levels above the container, and means for connecting the projections of each group together, comprising a substantially horizontal member passing through the projections of the group, the connecting members for the projections of each pair of adjacent groups being respectively located at different levels, substantially as described.

12. In combination, a pair of storage battery cells each comprising a container having a plurality of positive and negative plates therein, and a plurality of conducting members, said members being directly connected to different pairs respectively of the positive plates of one cell and to different pairs respectively of the negative plates of the other cell, substantially as described.

13. In combination, a pair of storage battery cells each comprising a container having a plurality of positive and negative plates therein, and a plurality of conducting bars, each of said bars having one end disposed between and in engagement with two adjacent positive plates of one cell and its other end disposed between and in engagement with two adjacent negative plates of the other cell, substantially as described.

14. In combination, a pair of storage battery cells each comprising a container having a plurality of positive and negative plates therein, the plates of each cell having substantially parallel portions projecting above the respective container through the top thereof, the negative and positive plates of each cell respectively having their projecting portions rigidly connected together in spaced relation, and means for electrically connecting and bracing the cells comprising a plurality of rigid conducting bars, each of said bars being rigidly secured at one end to the projecting portions of a pair of adjacent positive plates of one cell and at its other end to the projecting portions of a pair of adjacent negative plates of the other cell, substantially as described.

15. In a storage battery cell, the combination of a container, and a group of plates therein, the outside plates of the group each being electrically connected within the container and above the surface of the electrolyte to a plate of like polarity, the remaining plates having projections extending through the top of the container, substantially as described.

16. A stuffing box for storage battery cells comprising a resilient element provided with an opening in which a conductor is adapted to be disposed, and means for expanding said element laterally to form a fluid-tight joint between the same and a conductor disposed in the opening therein comprising a relatively movable member provided with means whereby a slight relative movement of such member and the resilient element toward each other will effect a comparatively great lateral expansion of the resilient element, substantially as described.

17. In a storage battery cell, the combination of a container, a plurality of plates therein, said plates having projections extending through the top of the container, there being a plurality of groups of said projections, and means for connecting the projections of each group together, the connecting means for each pair of adjacent groups being located at different levels, substantially as described.

This specification signed and witnessed this 12th day of August, 1914.

CHARLES W. NORTON.

Witnesses:
WILLIAM A. HARDY,
MARY J. LAIDLAW.

Copies of this patent may be obtained for five cents each, by addressing the "Commissioner of Patents, Washington, D. C."